United States Patent
Matias

(10) Patent No.: US 10,663,644 B2
(45) Date of Patent: May 26, 2020

(54) MOVABLE BARRIER OPENER WITH EDGE LIT PANEL MODULE

(71) Applicant: GMI Holdings, Inc., Mt. Hope, OH (US)

(72) Inventor: Greg Matias, Copley, OH (US)

(73) Assignee: GMI Holdings, Inc., Mt. Hope, OH (US)

( * ) Notice: Subject to any disclaimer, the term of this patent is extended or adjusted under 35 U.S.C. 154(b) by 0 days.

(21) Appl. No.: 16/044,151

(22) Filed: Jul. 24, 2018

(65) Prior Publication Data

US 2019/0025499 A1    Jan. 24, 2019

Related U.S. Application Data

(60) Provisional application No. 62/536,390, filed on Jul. 24, 2017.

(51) Int. Cl.
| | | |
|---|---|---|
| *G02B 6/00* | (2006.01) | |
| *F21V 8/00* | (2006.01) | |
| *G08B 5/36* | (2006.01) | |

(52) U.S. Cl.
CPC ......... *G02B 6/0083* (2013.01); *G02B 6/0036* (2013.01); *G02B 6/0041* (2013.01); *G02B 6/0068* (2013.01); *G08B 5/36* (2013.01)

(58) Field of Classification Search
CPC .. G02B 6/0036; G02B 6/0041; G02B 6/0068; G02B 6/0083; G08B 5/36
USPC ........................................ 340/5.7–5.71, 691.8
See application file for complete search history.

(56) References Cited

U.S. PATENT DOCUMENTS

| | | | | |
|---|---|---|---|---|
| 7,972,027 B1* | 7/2011 | Hatfield | ................... | F21S 2/00 362/217.02 |
| 2006/0202815 A1* | 9/2006 | John | ..................... | G08B 21/14 340/531 |
| 2009/0122534 A1* | 5/2009 | Olmsted | ................. | E05F 15/70 362/233 |
| 2010/0027293 A1* | 2/2010 | Li | .......................... | G02B 6/002 362/619 |
| 2014/0085924 A1* | 3/2014 | Li | .......................... | G09F 13/18 362/606 |

\* cited by examiner

*Primary Examiner* — Joseph H Feild
*Assistant Examiner* — Sharmin Akhter
(74) *Attorney, Agent, or Firm* — Haynes and Boone, LLP

(57) ABSTRACT

A movable barrier opener system is provided. The movable barrier opener system may include one or more edge lit panel modules. The one or more edge lit panel modules may include edge light sources that can be selectably illuminated by a controller of a movable barrier operator to communicate a system status to a user of the movable barrier opener system.

20 Claims, 3 Drawing Sheets

MOVABLE BARRIER OPENER WITH EDGE LIT PANEL MODULE

RELATED APPLICATION

This application claims the benefit of and priority from U.S. Provisional Patent Application Ser. No. 62/536,390, entitled "BRUSHLESS DC MOTOR OPERATOR," filed Jul. 24, 2017, and naming Greg Matias as inventor, which is incorporated in its entirety by reference herein for all purposes.

TECHNICAL FIELD

The present invention relates generally to movable barrier opener systems for opening and closing garage doors, gates, and like barriers, and relates in particular to auxiliary lighting for such systems.

BACKGROUND

Upward acting sectional or single panel garage doors, rollup doors, gates, and other types of powered movable barriers utilize movable barrier opener systems for effecting control over the movement of the barriers. A typical movable barrier opener system comprises a movable barrier operator and a drive assembly, including a motor, for imparting movement to the movable barrier (e.g., the garage door). The movable barrier operator includes a controller which, typically, constitutes a programmable platform such as a microprocessor, microcontroller, or the like, that is preprogrammed with the appropriate instructions and data for carrying out the desired processing. The operation of the barrier opener system is typically controlled by either user-actuation of (i) interior or exterior building mounted consoles, in wired or wireless communication with the movable barrier operator, (ii) hand held or vehicle mounted wireless transmitters in proximate location to the movable barrier operator, and/or (iii) remote network (e.g. Internet) access devices (e.g., Smartphones).

Many movable barrier opener systems often have auxiliary lighting for various purposes. For example, in the situations involving unattended closing of a garage door, flashing indicator lights are required to warn those who may be in the path of the imminently closing garage door. Furthermore, security lights may provide illumination to the proximate area of the opener so that the opener's user's vision is not impeded by the darkness. However, these auxiliary lights not only often present inconvenience and expense due to the infrastructure necessary to provide power to them, but their inclusion often increases the size and complexity, and therefore the expense, of the circuits associated with the auxiliary lighting. Other disadvantages are related to the inconvenience of often having to carry around the light actuators typically required by existing auxiliary lighting systems.

It is therefore a principal objective of the present invention to provide a new and improved form of auxiliary lighting for a movable barrier opener system, and in particular where the movable barrier may be the residential garage door. Such improved form of auxiliary lighting should desirably be of decreased size and complexity, be so configured to reduce the infrastructure required to supply power to such lighting, and avoid other inconveniences presently associated with auxiliary lighting for garage door openers.

SUMMARY

In accordance with these and other objectives, a movable barrier opener system is provided that includes an edge lit panel module operable by the barrier operator controller to not only provide auxiliary lighting, but to communicate barrier opener system status to the user. The edge lit panel module may be disposed in a remote actuator physically apart from, but in communication with, the movable barrier operator. Alternatively, it may be disposed in the movable barrier operator or even in the movable barrier itself. So disposed, the edge lit panel facilitates device miniaturization.

The edge lit panel module may include a light diffusion panel having an optically transmissive material configured to radiate light, and with an edge and a face connected by an optical path through the light diffusion panel. The module may include an edge light source adjacent to the edge of the light diffusion panel to provide sufficient light. The module may include diffusion effectors of the light diffusion panel along the optical path and configured to redirect the light. The light may enter the light diffusion panel through the edge and exit the light diffusion panel through the face.

Finally, a method of edge lighting implementable with a movable barrier opener system having a movable barrier operator configured to move a movable barrier is provided. The method may include providing, by a diffused emitted light from an edge lit panel module, a user alert of a system status of the movable barrier opener system.

BRIEF DESCRIPTION OF THE DRAWINGS

Alternate embodiments of the new and improved edge lit panel module apparatus and methods of the present invention, as well as additional features and details thereof, will become readily understood from the following detailed description, taken in connection with the appended drawings, in which.

DETAILED DESCRIPTION

Figure 1:
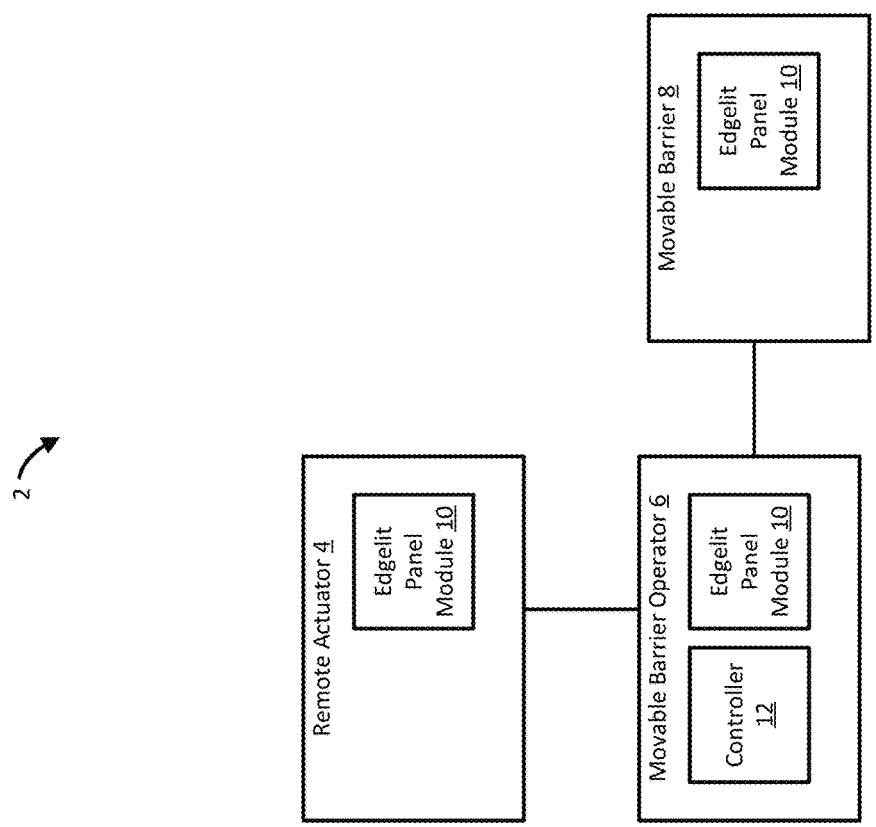
FIG. 1 is a functional block diagram of a movable barrier opener system adapted for incorporation of the new and improved method and apparatus of the present invention.

As used in this description and/or in the appended claims, the term "system status" means the status that a movable barrier opener system may communicate, particularly with the use of the edge lit panel module of the present invention. Accordingly, with initial reference to FIG. 1, the movable barrier opener system 2 includes remote actuator 4, movable barrier operator 6, and movable barrier. As illustrated, an edge lit panel module 10 may be disposed in the remote actuator 4, the movable barrier operator 6, and/or the movable barrier 8.

Regardless of which module in which the edge lit panel is implemented, the edge lit panel module 10 is effective to communicate the status of the movable barrier opener system. A system status may be an indication that a fault has occurred with one or more of the remote actuator 4, movable barrier operator 6, and/or movable barrier 8. The system status may be an indication that a movable barrier 8 is now, or will soon be moving. The system status may also be an acknowledgement of receipt of a user instruction, such as an acknowledgement of the pressing of a button (e.g., on a remote actuator 4 or on the movable barrier operator 6) to direct a movable barrier operator 6 (discussed further herein below) to start, stop, or change movement of a movable barrier 8. Moreover, the system status may include an indication of the status of connectivity of the system with a larger network.

For instance, the edge lit panel module 10 may illuminate red to indicate a fault, and illuminate green to indicate a successful network connection. Finally, the edge lit panel module 10 may be illuminable to provide lighting to enhance a user's sight. Thus, for convenience, the term "system status" may also broadly include illumination of security lighting to facilitate a user's sight.

With continued reference to FIG. 1, the movable barrier opener system 2 may include the movable barrier operator 6. The movable barrier operator 6 comprises a device connected to a movable barrier 8 and configured to move the movable barrier 8 to permit selective access to an area at least partially enclosed by the movable barrier 8. A movable barrier operator 6 may comprise a ceiling mountable unit connectable to a garage door and containing the motor that moves the garage door upward and downward.

A movable barrier opener system 2 may also include a remote actuator 4. The remote actuator 4 comprises a user interface device whereby a user directs the movable barrier operator 6 to start, stop, or change movement of the movable barrier 8. In various instances, the remote actuator 4 comprises a wall-mountable button that a user may press to cause a garage door to raise or lower. In further instances, the remote actuator 4 comprises a wireless device, such as may be carried by a user or placed in a user's vehicle with a user interface, such as a button, so that the user may direct the movable barrier operator 6 to start, stop, or change movement of the movable barrier 8 from a location remote from the movable barrier operator 6. For instance, the remote actuator 4 may permit a user who does not have physical access to an area at least partially enclosed by the movable barrier 8 to instruct the movable barrier operator 6 to move the movable barrier 8 so that the user may gain access to the area.

Each such aspect of the movable barrier opener system 2, whether the remote actuator 4, the movable barrier operator 6, and/or the movable barrier 8 itself may include lighting provided by the edge lit panel module 10. This lighting may be implemented to convey system status such as to signal a user by blinking or color changing or otherwise illuminating to convey a message to a user about the movable barrier opener system 2. All or some of the remote actuator 4, the movable barrier operator 6, and the movable barrier 8 may include an edge lit panel module 10 to provide the lighting. The lighting may also be implemented to provide security lighting to illuminate a proximate area so that a user can clearly see. In either such scenario, a controller 12 of the movable barrier operator 6 may control the illumination of the lighting. For example, a controller 12 of a movable barrier operator 6 may turn the lighting on, turn the lighting off, dim the lighting, brighten the lighting, blink the lighting, change the color of the lighting, and/or effectuate any other characteristic of the lighting that a particular edge lit panel module 10 is capable of.

Different edge lit panel modules 10 associated with different aspects of the movable barrier opener system 2 may have different features. Edge lit panel modules 10 with a diverse array of features may be installed together in a movable barrier opener system 2. For example, a movable barrier operator 6 may include an edge lit panel module 10 to provide security lighting to a garage. A remote actuator 4 may include an edge lit panel module 10 to illuminate upon the pressing by a user of a button or other control thereon, so that clear feedback is provided to the user confirming the interaction of the user with the remote actuator 4. The remote actuator 4 may include an edge lit panel module 10 to communicate information to a user such as states of the movable barrier opener system 2. For instance, the edge lit panel module 10 may blink or color change to confirm successful closure of a movable barrier 8, successful opening of a movable barrier 8, failed closure of a movable barrier 8, failed opening of a movable barrier 8, etc. The movable barrier 8 may include an edge lit panel module 10 to illuminate to provide security lighting proximate to the movable barrier 8. The movable barrier 8 may include an edge lit panel module 10 to illuminate to signal imminent motion of the movable barrier 8 and/or the like.

Thus, while the remote actuator 4, the movable barrier operator 6, and the movable barrier 8 may each have an edge lit panel module 10, and may have multiple edge lit panel modules 10 and/or a single edge lit panel module 10 with multiple functions, one will appreciate that FIG. 1 depicts a single edge lit panel module 10 associated with each of the remote actuator 4, the movable barrier operator 6, and the movable barrier 8 for convenience only. Other numbers and configurations of edge lit panel modules 10 are possible.

Figure 2:
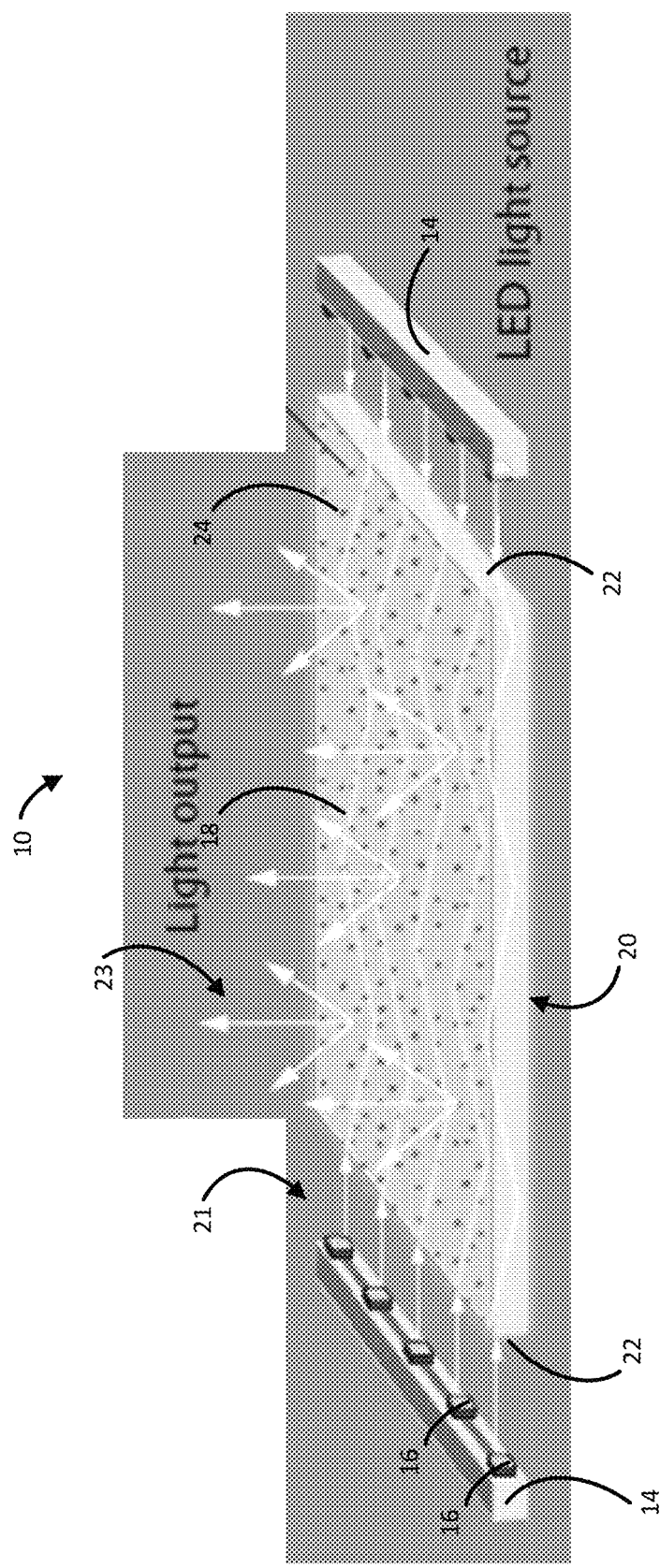
FIG. 2 is a detailed view of an example edge lit panel module of the movable barrier opener system of FIG. 1.

Directing attention now to FIG. 2, the details of the edge lit panel module 10 is disclosed. As mentioned, the edge lit panel module 10 generally provides an illumination source 16 proximate to an edge 22 that provides light to the light diffusion panel 20. The light diffusion panel 20 radiates diffuse emitted light 23 from a face 18 (e.g., a front and/or back) of a light diffusion panel 20. In this manner, the cross-sectional area of the edge lit panel module 10 is minimized by the adjacent emplacement of the illumination source 16 and the light diffusion panel 20 so that the light diffusion panel 20 does not stack atop the illumination source 16, but rather is positioned alongside the illumination source 16.

Specifically, an example edge lit panel module 10 may comprise a light diffusion panel 20. A light diffusion panel 20 comprises an optically transmissive material configured to radiate optical energy provided by a light source. For instance, the light diffusion panel 20 may comprise a glass panel, an epoxy panel, or a plastic panel. A plastic panel may be an acrylic or a polycarbonate. Other potential material configurations are also possible. The light diffusion panel 20 may comprise an edge 22 and a face 18. An edge 22 may comprise a perimeter surface of the light diffusion panel 20. A face 18 may comprise a surface of the light diffusion panel 20 bounded by the edge 22, such as a front or a back of the light diffusion panel 20. Thus one may appreciate that in various embodiments, the edge 22 joins the face 18 along one or more line. The joining of the edge 22 to the face 18 may be such that the edge 22 and the face 18 are perpendicular. For instance, the plane of edge 22 may be orthogonal to a plane of the face 18. Stated differently, three points lying in the surface of the edge 22 may occupy a plane that is non parallel to three points lying in the surface of the face 18. This non-parallel orientation facilitates the miniaturization of a device implementing the edge lit panel module 10 because the surface of an edge 22 may be at an angle other than 180 degrees relative to the surface of the face 18.

The edge lit panel module 10 may further comprise diffusion effectors 24. A diffusion effector 24 may comprise an patterning of the light diffusion panel 20 (represented by dark spots in FIG. 2, though frequently a practical patterning includes geometric figures such as trapezoidal, curved, triangular and/or other shape bosses and/or pits). For instance, a pattern of raised and/or lowered regions may be etched or otherwise formed in the light diffusion panel 20. Furthermore a diffusion effector 24 may comprise diffuser particles embedded in the light diffusion panel 20. A diffuser particle comprises a localized region of material contiguous with or embedded in the light diffusion panel 20.

In various instances, a diffusion effector 24 has a different refractive index than the material of the light diffusion panel 20 (e.g., an open volume of air in an etched pit area). In further instances, a diffuser particle has a different color than the material of the light diffusion panel 20, or has a different reflectivity than the light diffusion panel 20, or has a different opacity than the light diffusion panel 20. Diffusion effectors 24 are distributed throughout the light diffusion panel 20 to effectuate a diffuse emitted light 23 output radiating from the light diffusion panel 20 upon illumination.

The edge lit panel module 10 may further comprise one or more edge light source 14. An edge light source 14 may comprise one or more illumination sources 16 arranged in a pattern corresponding to an edge 22 of the light diffusion panel 20. An edge light source 14 may be adjacent to and/or contacting an edge 22 of a light diffusion panel 20. In various embodiments, multiple edge light sources 14 are associated with a single light diffusion panel 20.

An edge light source 14 may comprise a row of illumination sources 16. In various instances, the illumination sources 16 may be at least partially independently controllable by the controller 12 (FIG. 1). For instance, different of the illumination sources 16 of the edge light source 14 may be different color, different brightness, and illuminated at different times. While a plurality of illumination sources 16 are depicted in connection with an edge light source 14 in FIG. 2, in further instances, an edge light source 14 comprises a single illumination source 16.

Each illumination source 16 may comprise a light generating apparatus. For instance, an illumination source 16 may comprise a light emitting diode (LED). An illumination source 16 may comprise any other light generation apparatus as desired. An illumination source 16 generates light radiating into an edge 22 of the light diffusion panel 20, wherein it is redirected in one or more different direction by one or more diffusion effector 24. For instance, light radiating from the illumination source 16 may enter light diffusion panel 20 on an edge 22 and diffuse emitted light 23 may exit the light diffusion panel 20 via a face 18 of the edge lit panel module 10.

Figure 3:
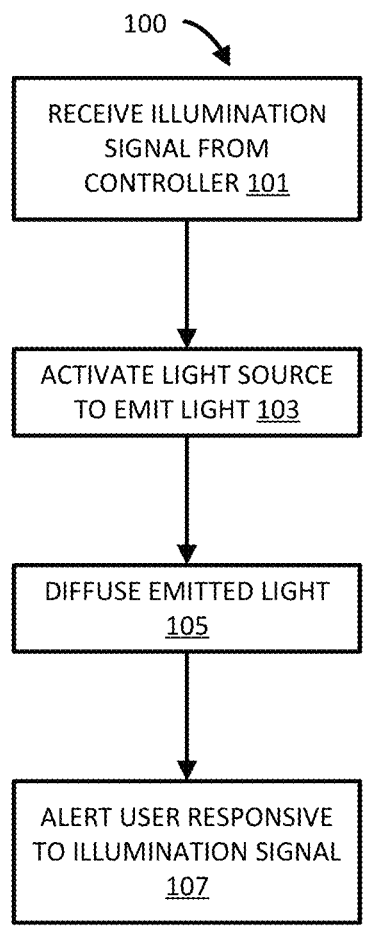
FIG. 3 is a flowchart of an edge lighting method implementable with the auxiliary lighting arrangement of the present invention.

With ongoing reference to FIGS. 1 and 2, but additional reference to FIG. 3, an edge lighting method 100 implementable with a movable barrier opener system is disclosed. The edge lighting method 100 may include receiving an illumination signal from a controller 12 (block 101). For instance, a controller 12 of a movable barrier operator 6 may transmit an illumination signal to an edge lit panel module 10. The illumination signal may comprise data instructions related to the illumination of one or more edge light source 14 of an edge lit panel module 10. In further instances, the illumination signal may comprise an electrical current provided to the edge light source 14 of the edge lit panel module 10 by the controller 12.

Responsive to the illumination signal, the edge lit panel module 10 may activate an edge light source 14 to emit light (block 103). For instance, responsive to an illumination signal, the edge light source 14 may begin emitting light.

Contemporaneously with the emission of light from the edge light source 14, the edge lit panel module 10 may diffuse emitted light (block 105). Specifically, the light diffusion panel 20 of the edge lit panel module 10 may receive the emitted light into an edge 22. Traveling through the interior of the edge light diffusion panel 20, the light may pass along an optical path and encounter diffusion effector(s) 24 which redirect the light. The redirected light radiates from the face 18 of the edge light diffusion panel 20 as diffuse emitted light 23.

Consequently, the controller 12 may, via the radiation of light from the face 18 of the edge light diffusion panel 20 alert a user responsive to the illumination signal (block 107). For instance, in response to the illumination signal, the radiation of light from the face 18 of the edge light diffusion panel 20 may convey system status to the user.

To summarize one example implementation of the method 100, the controller 12 may provide an illumination signal in connection with an imminent movement of a movable barrier 8. The edge lit panel module 10 may activate an edge light source 14 to emit light upon receiving the illumination signal. The edge lit panel module 10 may receive the emitted light into an edge 22 and radiate the emitted light from a face 18. The emission of light may be associated with the imminent movement of the movable barrier 8, such that the user is alerted to the system status comprising an imminent movement (or other relevant information) responsive to the illumination signal.

One may appreciate that various aspects of the movable barrier opener system 2 interoperate to effectuate a method 100 as discussed above. However, one will appreciate that while certain aspects of the method 100 are discussed in sequence, in various embodiments, aspects of the method 100 may occur in parallel. In addition, aspects of the method 100 may occur in different sequences.

Moreover, while the present disclosure has been described in the context of a limited number of embodiments, those skilled in the art, having benefit of this disclosure, will appreciate that other embodiments can be envisioned that also embody the new and improved process and apparatus of the present invention.

The invention claimed is:

1. A movable barrier opener system comprising:
    a movable barrier;
    a movable barrier operator connected to the movable barrier to move the movable barrier, the movable barrier operator comprising a controller;
    a remote actuator disposed physically apart from the movable barrier operator and comprising a user interface operable by a user to direct the controller of the movable barrier operator to move the movable barrier; and
    an edge lit panel module operable by the controller to communicate a system status to the user, wherein the edge lit panel module is disposed in the movable barrier and comprises:
        a light diffusion panel comprising an optically transmissive material configured to radiate light and comprising an edge and a face, the edge comprising a perimeter surface of the light diffusion panel, and the face comprising a surface bounded by the edge, the edge and the face connected by an optical path through the light diffusion panel;
        an edge light source adjacent to the edge of the light diffusion panel to provide the light; and
        a diffusion effector of the light diffusion panel along the optical path and configured to redirect the light, the diffusion effector comprising diffuser particles embedded in the light diffusion panel;
wherein the light enters the light diffusion panel through the edge and exits the light diffusion panel through the face.

2. The movable barrier opener system of claim 1, wherein the edge light source comprises a plurality of light emitting diodes arranged in a row.

3. The movable barrier opener system of claim 2, wherein a first portion of the plurality of light emitting diodes emits light of a first color and wherein a second portion of the plurality of light emitting diodes emits light of a second color.

4. The movable barrier opener system of claim 1, wherein the edge lit panel module comprising a further edge light source, wherein the edge light source is selectably illuminable by the controller in response to the system status, and wherein the further edge light source is selectably illuminable by the controller to provide security lighting.

5. An edge lit panel module of a movable barrier opener system comprising a movable barrier operator connected to a movable barrier to move the movable barrier and a remote actuator disposed physically apart from the movable barrier operator and operable by a user to direct the movable barrier operator to move the movable barrier, the edge lit panel module comprising:
a light diffusion panel installed in at least one of the movable barrier operator, the movable barrier, or the remote actuator of the movable barrier opener system, the light diffusion panel comprising an optically transmissive material configured to radiate light and comprising an edge and a face, the edge comprising a perimeter surface of the light diffusion panel, and the face comprising a surface bounded by the edge, the edge and the face connected by an optical path through the light diffusion panel;
an edge light source adjacent to the edge of the light diffusion panel to selectively illuminate to provide the light in response to a system status of the movable barrier opener system, wherein the edge light source comprises a plurality of light emitting diodes, wherein a first portion of the plurality of light emitting diodes emits light of a first color, and wherein a second portion of the plurality of light emitting diodes emits light of a second color, wherein the first portion is illuminable during a first period of time corresponding to a first system status and the second portion is illuminable during a second period of time corresponding to a second system status; and
a diffusion effector along the optical path and configured to redirect the light, wherein the light enters the light diffusion panel through the edge and exits the light diffusion panel through the face.

6. The edge lit panel module according to claim 5, wherein a controller of the movable barrier opener system selectively illuminates the edge light source to provide the light in response to the system status, and wherein the system status comprises an imminent movement of the movable barrier by the movable barrier operator.

7. The edge lit panel module according to claim 5, wherein the light diffusion panel is installed in the movable barrier.

8. The edge lit panel module according to claim 5, wherein the light diffusion panel is installed in the remote actuator.

9. The edge lit panel module according to claim 5, wherein the first system status corresponds to the movable barrier being open and the second system status corresponds to the movable barrier being closed.

10. The edge lit panel module according to claim 5, wherein the first system status corresponds to a fault during a network connection attempt and the second system status corresponds to a successful network connection attempt.

11. The edge lit panel module according to claim 5, wherein the first period of time and second period of time at least partially overlap, wherein the first system status comprises illumination of security lighting and the second system status comprises imminent motion of the movable barrier.

12. A method of edge lighting implementable with a movable barrier opener system comprising a movable barrier operator configured to move a movable barrier, the method comprising:
receiving, by an edge lit panel module disposed in the movable barrier, an illumination signal from a controller of the movable barrier operator;
activating, by the edge lit panel module, an edge light source to emit light into an edge of a light diffusion panel comprising an optically transmissive material, in response to the received illumination signal;
diffusing, by diffusion effectors disposed along an optical path of the light diffusion panel, the emitted light;
radiating, from a face of the light diffusion panel, diffused emitted light; and
providing, by the diffused emitted light, a system status of the movable barrier opener system.

13. The method of claim 12, wherein the edge lit panel module comprises:
a further edge light source, wherein the edge light source is selectably illuminable by the controller to convey the system status, and wherein the further edge light source is selectably illuminable by the controller to provide security lighting proximate the movable barrier.

14. The method of claim 13, wherein the system status comprises confirmation of receipt of an instruction from a remote actuator.

15. The method of claim 12, wherein the system status comprises an imminent movement of the movable barrier.

16. The method of claim 12, wherein the edge light source comprises a plurality of light emitting diodes.

17. The method of claim 16, wherein a first portion of the plurality of light emitting diodes emits light of a first color, and wherein a second portion of the plurality of light emitting diodes emits light of a second color, wherein the first portion is illuminable at a first time corresponding to the system status and the second portion is illuminable at a second time corresponding to a second system status.

18. A movable barrier system comprising:
a movable barrier; and
an edge lit panel module disposed in the movable barrier, the edge lit panel module comprising:
a light diffusion panel comprising an optically transmissive material configured to radiate light and comprising an edge and a face, the edge comprising a perimeter surface of the light diffusion panel, and the face comprising a surface bounded by the edge, the edge and the face connected by an optical path through the light diffusion panel;
an edge light source adjacent to the edge of the light diffusion panel to provide the light; and
a diffusion effector of the light diffusion panel along the optical path and configured to redirect the light, the diffusion effector comprising diffuser particles embedded in the light diffusion panel;

wherein the light enters the light diffusion panel through the edge and exits the light diffusion panel through the face.

19. The movable barrier system of claim 18, wherein the edge lit panel module is configured to illuminate an area proximate the movable barrier.

20. The movable barrier system of claim 18, wherein the edge lit panel module is configured to communicate a system status of a movable barrier operator to a user.

\* \* \* \* \*